US012628834B2

(12) United States Patent
Chen et al.

(10) Patent No.: US 12,628,834 B2
(45) Date of Patent: May 19, 2026

(54) BREAD WITH D-ALLULOSE INSTEAD OF SUCROSE AND A PREPARATION METHOD THEREFOR

(71) Applicant: HENAN ZHONGDA HENGYUAN BIOTECHNOLOGY STOCK CO., LTD., Luohe City (CN)

(72) Inventors: Xuejiao Chen, Luohe City (CN); Zhenqi Yan, Luohe City (CN); Wenjin Zhang, Luohe City (CN); Jingjing Liu, Luohe City (CN); Jiayao Zhang, Luohe City (CN)

(73) Assignee: HENAN ZHONGDA HENGYUAN BIOTECHNOLOGY STOCK CO., LTD., Luohe City (CN)

( * ) Notice: Subject to any disclaimer, the term of this patent is extended or adjusted under 35 U.S.C. 154(b) by 373 days.

(21) Appl. No.: 18/219,663

(22) Filed: Jul. 8, 2023

(65) Prior Publication Data

US 2024/0057619 A1     Feb. 22, 2024

(30) Foreign Application Priority Data

Aug. 22, 2022   (CN) ......................... 202211004922.0

(51) Int. Cl.
*A21D 13/062* (2017.01)
*A21D 2/18* (2006.01)
(Continued)

(52) U.S. Cl.
CPC ........... *A21D 13/062* (2013.01); *A21D 2/181* (2013.01); *A21D 2/265* (2013.01); *A21D 2/34* (2013.01); *A21D 8/045* (2013.01); *A21D 8/047* (2013.01)

(58) Field of Classification Search
CPC ........ A21D 13/062; A21D 2/265; A21D 2/34; A21D 8/045; A21D 8/04
See application file for complete search history.

(56) References Cited

U.S. PATENT DOCUMENTS 4,109,018 A   *   8/1978   Thompson ............... A21D 2/18
                                                               426/549
2012/0076893 A1*   3/2012   Asayama ............. A21D 13/062
                                                               426/549

FOREIGN PATENT DOCUMENTS

CN          114258929 A     4/2022
JP          H08191667 A     7/1996
            (Continued)

OTHER PUBLICATIONS

Gui (CN 11183821) Machine Translation (Year: 2020).*

(Continued)

*Primary Examiner* — Felicia C Turner

(57) ABSTRACT

The invention provides a bread with D-allulose instead of sucrose and a preparation method therefor, and relates to the technical field of food processing. The starting materials include, in parts by weight: 40-60 parts of flour, 3-5 parts of gluten powder, 5-10 parts of D-allulose, 5-10 parts of eggs, 5-10 parts of milk, 3-5 parts of yeast, 4-6 parts of butter, 0.4-0.6 parts of composite bacterial powder, and 15-25 parts of water. The yeast is fresh yeast. The composite bacterial powder includes one or more of *Lactobacillus acidophilus, Lactobacillus casei, Lactobacillus rhamnosus, Bifidobacterium longum* and *Bifidobacterium lactis*. Replacing sucrose with D-allulose in bread does not affect the normal proofing of bread dough, and the baked bread is fluffy and soft, sweet, and delicious, has good color, aroma, and taste. Because D-allulose has the advantages of low calorie and low blood sugar response, consumers' pursuit of "healthy eating" is met.

1 Claim, 1 Drawing Sheet

A sensory evaluation radar chart of the examples and the comparative examples

(51) Int. Cl.
    *A21D 2/26*         (2006.01)
    *A21D 2/34*         (2006.01)
    *A21D 8/04*         (2006.01)

(56)            References Cited

FOREIGN PATENT DOCUMENTS

| | | | |
|---|---|---|---|
| JP | H1142045 A | 2/1999 | |
| JP | 2007508809 A | 4/2007 | |
| JP | 2012070687 A | 4/2012 | |
| KR | 20190049480 A | 5/2019 | |
| WO | WO-2015075473 A1 * | 5/2015 | ............... A21D 2/18 |
| WO | WO-2021080871 A1 * | 4/2021 | ............. A21D 2/181 |

OTHER PUBLICATIONS

Kim et al. (TW 1687162) Machine Translation (Year: 2020).*
Kim (KR 101969809) Apr. 2019 Machine Translation (Year: 2019).*
Maiocco "flour 101:amount . . . " Jul. 2010 https://www.talkoftomatoes.com/blog/2010/07/flour-101 (Year: 2010).*
Hayley Sugg https://www.allrecipes.com/article/what-is-vital-wheat-gluten-how-to-use/ Sep. 2020 (Year: 2020).*
Zhang et al. CN 107058192 Machine Translation (Year: 2017).*
Takeda, Taisuke et al., Characteristics of Lactic Acid Bacteria Isolated from Bread-Dough, Compressed-Yeast and Active Dry-Yeast, Nippon Shokuhin Kogyo Gakkaishi, 1984, vol. 31, No. 10, pp. 642-648.

* cited by examiner

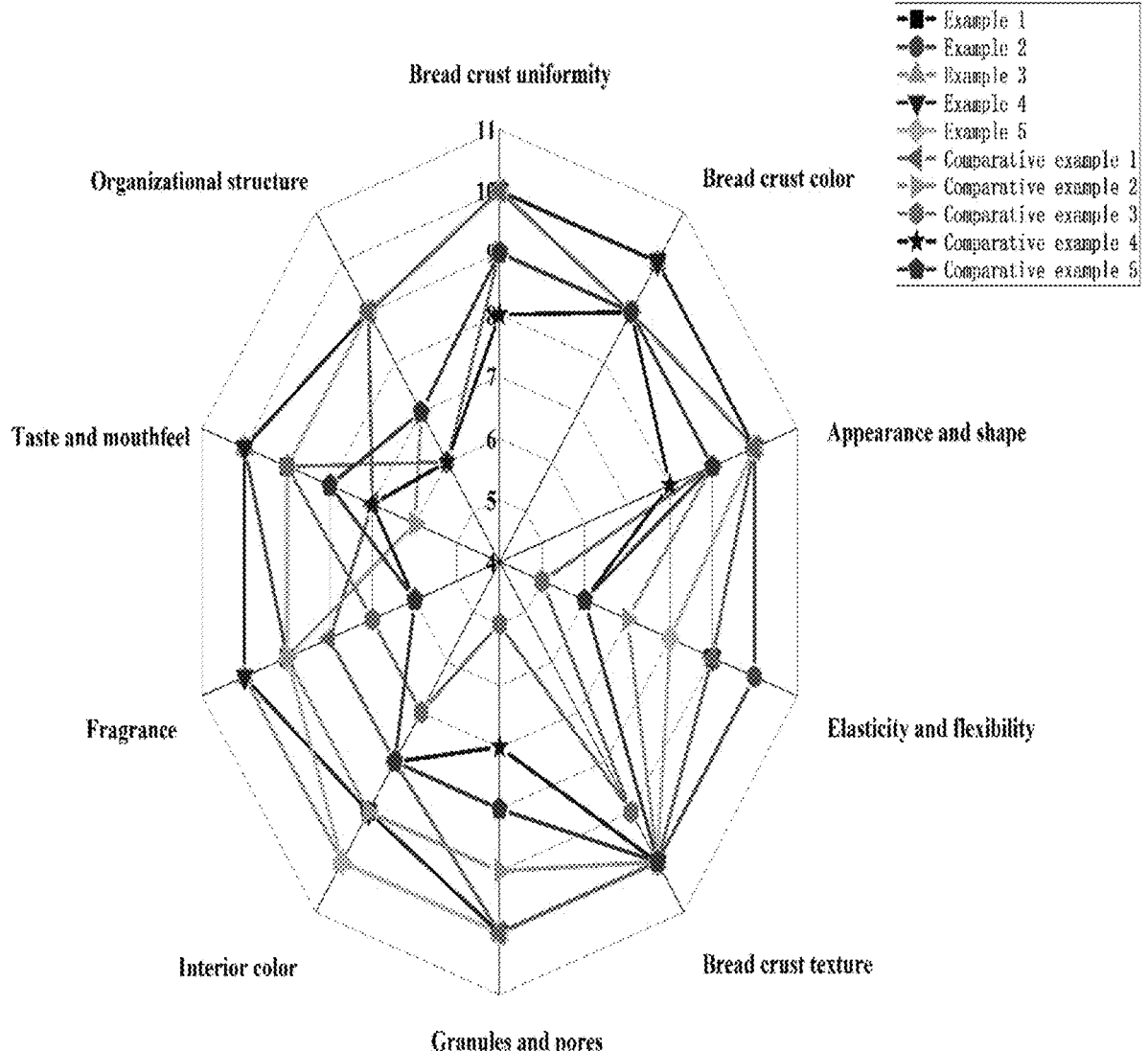
A sensory evaluation radar chart of the examples and the comparative examples

BREAD WITH D-ALLULOSE INSTEAD OF SUCROSE AND A PREPARATION METHOD THEREFOR

This application claims priority to Chinese Patent Application No. 202211004922.0, filed on Aug. 22, 2022, which is incorporated by reference for all purposes as if fully set forth herein.

TECHNICAL FIELD

The invention relates to the technical field of food processing, in particular to a bread with D-allulose instead of sucrose and a preparation method therefor.

BACKGROUND

Sucrose is a disaccharide mainly processed from sugar cane and sugar beets. After intake, sucrose is decomposed into glucose and fructose in the human body, providing the human body with the energy needed for life activities. Moderate consumption of sucrose would not cause harm to the human body, but if too much sucrose is consumed, sucrose would be converted into energy in the body, and when the excess energy cannot be used, it would be converted into fat, leading to obesity, and obesity is one of the high-risk factors for cerebrovascular disease, diabetes, and other diseases. In addition, sucrose has a certain degree of adhesion, and it is easy to stay on the surface of the teeth after consuming a large amount of sucrose and is used by bacteria in the oral cavity to generate acidic substances, which would further damage the surface of the teeth and easily induce dental caries in the long run.

As an indispensable raw material in bread making, sucrose has two main functions in traditional bread recipes: one is to provide the main source of sweet substances for bread, so that bread has a sweet taste; the other one is that it can be decomposed into glucose and fructose by invertase in yeast to provide energy for yeast. Yeast relies on the monosaccharides formed by the decomposition of sucrose to ferment, producing a large amount of carbon dioxide, which makes the dough expand and form loose, sponge-like pores, thereby increasing the volume of the bread and producing a soft taste.

Bread is one of the important foods in people's daily life. Traditional bread is a convenient meal replacement food made from flour, sucrose, and oil as the main raw materials through processes such as dough kneading, proofing, and baking. Bread is convenient to carry, easy to digest and absorb, soft and sweet in taste, and is especially favored by students and office workers. Traditional bread is added with sucrose, and is a high-sugar, high-fat, high-calorie food, which is very unfavorable for human nutrition balance and health maintenance, and is not suitable for obese people, high blood sugar and diabetic people.

D-allulose (CAS number: 551-68-8, molecular formula: $C_6H_{12}O_6$, molecular weight: 180.16) belongs to hexose and ketose in classification and is the epimer corresponding to the third carbon of D-fructose. As a six-carbon rare ketose, allulose has high solubility, and its sweetness is 70% of that of sucrose, but it has only 0.4 calories per gram, compared with 4 calories per gram of sucrose. In 2011, D-allulose was certified safe by the FDA and can be used as an additive in the food and dietary fields.

In the field of food applications, on the one hand, D-allulose not only has high sweetness and a taste close to sucrose, but also has a different metabolism from sucrose and would not increase blood sugar. Therefore, D-allulose is a very attractive sucrose substitute for consumers who are concerned about blood sugar. On the other hand, compared with D-fructose and D-glucose, D-allulose can react with proteins in food to generate more Maillard products, improve the flavor of food, and maintain the antioxidant level of food for a longer time.

However, when D-allulose is used in bread, it cannot be decomposed into monosaccharides, thus it cannot be decomposed and utilized by yeast, and cannot provide an energy source. On the contrary, addition of D-allulose in bread would also inhibit the activity of yeast, thereby affecting the utilization of maltose formed by the decomposition of starch by yeast, resulting in slower growth and proliferation of yeast, which makes it more difficult for dough to proof after adding allulose in bread, and there are fewer pores, which makes it difficult to form a soft and delicate taste. Therefore, under the premise of ensuring the normal proofing of bread dough, it is particularly important how to choose the types and proportions of various raw materials in the bread recipes in which sucrose is replaced with D-allulose.

Therefore, it is an urgent problem for those skilled in the art to develop a low-sugar and low-calorie bread with D-allulose as raw material instead of sucrose, which is suitable for obese people, three high people and diabetic patients.

SUMMARY OF THE INVENTION

The purpose of the present invention is to provide a bread with D-allulose instead of sucrose. The bread uses D-allulose as a sweetener, which not only considers the taste experience of high sweetness, but also does not raise blood sugar, achieving the purpose of healthy eating.

The technical solution provided by the invention solves the technical problem that D-allulose cannot be decomposed and utilized by yeast and cannot provide an energy source when it is applied to bread. Meanwhile, nutritional and healthy bread products with good taste is prepared with rich raw materials.

In order to achieve the above object, the present invention provides a bread with D-allulose instead of sucrose, which comprises the following raw materials in parts by weight: 40-60 parts of flour, 3-5 parts of gluten powder, 5-10 parts of D-allulose, 5-10 parts of eggs, 5-10 parts of milk, 3-5 parts of yeast, 4-6 parts of butter, 0.4-0.6 parts of composite bacterial powder, and 15-25 parts of water.

In a preferred embodiment, the protein content of the flour is 11.5-13.5%.

In a preferred embodiment, the yeast is fresh yeast.

In a preferred embodiment, the composite bacterial powder comprises one or more of *Lactobacillus acidophilus, Lactobacillus casei, Lactobacillus rhamnosus, Bifidobacterium longum* and *Bifidobacterium lactis*.

In a preferred embodiment, the composite bacterial powder comprises *Lactobacillus acidophilus, Lactobacillus casei, Lactobacillus rhamnosus, Bifidobacterium longum* and *Bifidobacterium lactis* mixed in a mass ratio of (0.5-2):(2-4):(0.5-2):(1-3):(1-3).

Another object of the present invention is to provide a method for preparing a bread with D-allulose instead of sucrose, and the production and preparation of the bread can be completed with conventional household equipment and environment. The overall preparation process is simple and safe, has strong operability and good universality, and is not only suitable for preparation at home, but also suitable for large-scale industrial production operations.

In order to achieve the above object, the present invention provides a method for preparing a bread with D-allulose instead of sucrose, the method specifically comprises the following steps:

(1) stirring and dispersing a fresh yeast and a composite bacterial powder in a warm water to obtain a mixed bacterial liquid;

(2) putting a flour, a gluten power, and a D-allulose into a dough mixer, and stirring same under a first mixing condition to obtain a mixed dry powder;

adding an egg, a milk and the mixed bacterial liquid into the dry powder under stirring, stirring and kneading same under a second mixing condition to obtain a dough;

adding a butter to the dough, and stirring same under a third mixing condition to obtain a shaped dough;

(3) fermenting the shaped dough;

(4) weighing and dividing the fermented dough to obtain small doughs with a single weight of 30-60 g, proofing the small doughs to obtain bread doughs;

and (5) putting the bread doughs in an oven and baking same to obtain the bread with D-allulose instead of sucrose.

In a preferred embodiment, in step (2), the first mixing condition is a stirring speed of 100-150 r/min and a stirring time of 2-3 min;

the second mixing condition is a stirring speed of 100-150 r/min and a stirring time of 5-10 min;

and the third mixing condition is a stirring speed of 250-300 r/min and a stirring time of 3-5 min.

In a preferred embodiment, in step (3), a condition for the fermenting is a fermentation temperature of 35-40° C., a relative humidity of 80%-90%, and a fermentation time of 60-90 min.

In a preferred embodiment, in step (3), a condition for the proofing is a fermentation temperature of 35-40° C., a relative humidity of 80%-90%, and a fermentation time of 80-100 min.

In a preferred embodiment, in step (3), a condition for the baking is an oven temperature of 180° C.-210° C. and a baking time of 10-20 min.

Compared with the prior art, the technical solution of the present invention has the following advantages:

The invention solves the problems of poor proofing effect and poor taste when D-allulose is directly used to replace sucrose to prepare bread in the prior art. Through the optimized design of raw materials and dosage, a composite bacterial powder prepared from *Lactobacillus acidophilus, Lactobacillus casei, Lactobacillus rhamnosus, Bifidobacterium longum* and *Bifidobacterium lactis*, gluten power and fresh yeast are added in a recipe to improve the proofing effect of bread and the utilization of D-allulose by yeast from many aspects. This would not affect the normal proofing of bread dough, and the baked bread is fluffy and soft, sweet, and delicious, has good color, aroma, and taste. At the same time, because D-allulose has the advantages of low calorie and low blood sugar response, consumers' pursuit of "healthy eating" is also satisfied. The prepared bread has large and uniform pores in the internal structure, and has rich, soft, and delicate taste, which provides a new bread choice for consumers with sugar control needs.

BRIEF DESCRIPTION OF THE DRAWING

FIG. 1 is a sensory evaluation radar chart of the examples and the comparative examples.

DETAILED DESCRIPTION OF EMBODIMENTS

In order to enable those skilled in the art to better understand the present invention, the present invention will be described in further detail below in conjunction with the specific embodiments, but it should be understood that the protection scope of the present invention is not limited by the specific embodiments.

The examples of the present invention provide a bread with D-allulose instead of sucrose and a preparation method therefor, which solves the problem in the prior art that when D-allulose is used in bread, it is difficult to be decomposed and utilized by yeast, and affects yeast's ability to decompose starch to form maltose, leading to difficult bread proofing, less pores, and poor taste.

The technical solution in the present invention is to solve the above problems, and the general train of thought is as follows:

The present invention provides a bread with D-allulose instead of sucrose, which comprises the following raw materials in parts by weight: 40-60 parts of flour, 3-5 parts of gluten powder, 5-10 parts of D-allulose, 5-10 parts of eggs, 5-10 parts of milk, 3-5 parts of yeast, 4-6 parts of butter, 0.4-0.6 parts of composite bacterial powder, and 15-25 parts of water.

In a preferred embodiment, the following raw materials are comprised in parts by weight: 45-55 parts of flour, 3.5-4.5 parts of gluten powder, 6-9 parts of D-allulose, 7-8 parts of eggs, 7-8 parts of milk, 3.5-4.5 parts of yeast, 4.5-5.5 parts of butter, 0.45-0.55 parts of composite bacterial powder, and 18-22 parts of water.

In a preferred embodiment, the following raw materials are comprised in parts by weight: 50 parts of flour, 4 parts of gluten powder, 8 parts of D-allulose, 7 parts of eggs, 7 parts of milk, 4 parts of yeast, 5 parts of butter, 0.5 parts of composite bacterial powder, 20 parts of water.

In a preferred embodiment, the protein content of the flour is 11.5-13.5%. If the protein content in the flour is within this range, the flour can have better water absorption, and the dough would be formed into a film after stirring and kneading, so that the prepared bread would have a fluffier and fuller mouthfeel.

In a preferred embodiment, the yeast is fresh yeast. In the present invention, a fresh yeast is used to replace a dry yeast to make it easier to ferment and reduce the influence on yeast fermentation after replacing sucrose with D-allulose. Moreover, the fresh yeast has better vitality, which is conducive to the proofing of the dough and the formation of pores.

In a preferred embodiment, the composite bacterial powder comprises one or more of *Lactobacillus acidophilus, Lactobacillus casei, Lactobacillus rhamnosus, Bifidobacterium longum* and *Bifidobacterium lactis*.

In a preferred embodiment, the composite bacterial powder comprises *Lactobacillus acidophilus, Lactobacillus casei, Lactobacillus rhamnosus, Bifidobacterium longum* and *Bifidobacterium lactis* mixed in a mass ratio of (0.5-2):(2-4):(0.5-2):(1-3):(1-3).

In the present invention, Bifidobacteria can improve sugar metabolism, decompose macromolecular sugars, starch, etc. by releasing glycosidase, β-glucosidase, galactosidase, amylase, etc., and can cooperate with yeast to increase the fermentation volume of the dough. *Lactobacillus casei* can carry out facultative heterofermentation during the fermentation process, produce gas, and can also greatly increase the fermentation volume of the dough, thereby solving the problem that D-allulose cannot be decomposed into monosaccharides and cannot be decomposed and utilized by yeast. In addition, *Lactobacillus* and Bifidobacteria produce three types of exopolysaccharides during fermentation and metabolism: glucans, fructans, heteropolysaccharides. These exopolysaccharides have the functions of stabilizers and emulsifiers, which can increase the stability of the three-dimensional network structure in the dough, enhance its gas holding capacity, and increase the fermentation volume.

After many experiments and explorations, it was found that adding a composite probiotic powder of *Lactobacillus acidophilus, Lactobacillus casei, Lactobacillus rhamnosus, Bifidobacterium longum* and *Bifidobacterium lacti* can effectively solve the problem of difficulty in bread fermentation and enrich the taste and flavor of the bread.

Another object of the present invention is to provide a method for preparing a bread with D-allulose instead of sucrose, and the production and preparation of the bread can be completed with conventional household equipment and environment. The overall preparation process is simple and safe, has strong operability and good universality, and is not only suitable for preparation at home, but also suitable for large-scale industrial production operations.

In order to achieve the above object, the present invention provides a method for preparing a bread with D-allulose instead of sucrose, the method specifically comprises the following steps:

(1) stirring and dispersing a fresh yeast and a composite bacterial powder in a warm water to obtain a mixed bacterial liquid;

(2) putting a flour, a gluten power, and a D-allulose into a dough mixer, and stirring same under a first mixing condition to obtain a mixed dry powder;

adding an egg, a milk, and the mixed bacterial liquid into the dry powder under stirring, stirring and kneading same under a second mixing condition to obtain a dough;

adding a butter to the dough, and stirring same under a third mixing condition to obtain a shaped dough;

(3) fermenting the shaped dough;

(4) weighing and dividing the fermented dough to obtain small doughs with a single weight of 30-60 g, proofing the small doughs to obtain bread doughs;

and (5) putting the bread doughs in an oven and baking same to obtain the bread with D-allulose instead of sucrose.

In a preferred embodiment, in step (2), the first mixing condition is a stirring speed of 100-150 r/min and a stirring time of 2-3 min;

the second mixing condition is a stirring speed of 100-150 r/min and a stirring time of 5-10 min;

and the third mixing condition is a stirring speed of 250-300 r/min and a stirring time of 3-5 min.

In a preferred embodiment, in step (3), a condition for the fermenting is a fermentation temperature of 35-40° C., a relative humidity of 80%-90%, and a fermentation time of 60-90 min.

In a preferred embodiment, in step (3), a condition for the proofing is a fermentation temperature of 35-40° C., a relative humidity of 80%-90%, and a fermentation time of 80-100 min.

In a preferred embodiment, in step (3), a condition for the baking is an oven temperature of 180° C.-210° C. and a baking time of 10-20 min.

The technical solution of the present application is described in detail below by specific examples:

If not specified, the technical means used in the present invention are conventional means well known to those skilled in the art, and various raw materials, reagents, instruments, equipments, etc. used in the present invention can be purchased through the market or can be prepared by existing methods.

In the present invention, parts by weight can be μg, mg, g, kg, and other well-known weight units in the art, and can also be multiples thereof, such as 1/10, 1/100, 10 times, 100 times, etc.

Example 1

For a bread with D-allulose instead of sucrose, the weight ratio of each raw material component in its recipe is as follows:

| | |
|---|---|
| Flour | 40 parts; |
| Gluten powder | 5 parts; |
| D-allulose | 8 parts; |
| Eggs | 5 parts; |
| Milk | 5 parts; |
| Fresh yeast | 4 parts; |
| Butter | 5 parts; |
| Composite bacterial powder | 0.4 parts; |
| Water | 16 parts; |

Among them, the composite bacterial powder is a mixture of *Lactobacillus acidophilus, Lactobacillus casei, Lactobacillus rhamnosus, Bifidobacterium longum* and *Bifidobacterium lacti* at a mass ratio of 1:3:1:2:2.

The preparation process comprises the following steps:

(1) stirring and dispersing a fresh yeast and a composite bacterial powder in a warm water at 30° C.-40° C. to obtain a mixed bacterial liquid;

(2) putting the flour, the gluten power, and the D-allulose into a dough mixer, stirring same for 2-3 min at 100-150 r/min to uniformly mix the dry powder, then adding the eggs, the milk, and the mixed bacterial liquid in sequence under stirring, stirring same for 5-10 min at 100-150 r/min; kneading same to obtain a shaped dough, then adding the butter, stirring same for 3-5 min at 250-300 r/min to obtain a finally shaped dough;

(3) putting the prepared dough at a temperature of 35-40° C. and a relative humidity of 80-90% to ferment for 60-90 min;

(4) weighing the fermented dough, dividing same into small doughs with a single weight of 30 g, and proofing same for 80-100 min at a temperature of 35-40° C. and a relative humidity of 80-90% to obtain a bread dough;

(5) putting the bread dough into an oven for baking at a temperature of 180-210° C., and taking the baked bread out after baking for 13 minutes.

Example 2

For a bread with D-allulose instead of sucrose, the weight ratio of each raw material component in its recipe is as follows:

| | |
|---|---|
| Flour | 60 parts; |
| Gluten powder | 3 parts; |
| D-allulose | 10 parts; |
| Eggs | 10 parts; |
| Milk | 10 parts; |
| Fresh yeast | 5 parts; |

-continued

| | |
|---|---|
| Butter | 6 parts; |
| Composite bacterial powder | 0.6 parts; |
| Water | 24 parts; |

Among them, the composite bacterial powder is a mixture of *Lactobacillus acidophilus, Lactobacillus casei, Lactobacillus rhamnosus, Bifidobacterium longum* and *Bifidobacterium lacti* at a mass ratio of 1.5:2.5:1.5:1.5:1.5.

The preparation process comprises the following steps:

(1) stirring and dispersing a fresh yeast and a composite bacterial powder in a warm water at 30° C.-40° C. to obtain a mixed bacterial liquid;

(2) putting the flour, the gluten power, and the D-allulose into a dough mixer, stirring same for 2-3 min at 100-150 r/min to uniformly mix the dry powder, then adding the eggs, the milk, and the mixed bacterial liquid in sequence under stirring, stirring same for 5-10 min at 100-150 r/min; kneading same to obtain a shaped dough, then adding the butter, stirring same for 3-5 min at 250-300 r/min to obtain a finally shaped dough;

(3) putting the prepared dough at a temperature of 35-40° C. and a relative humidity of 80-90% to ferment for 60-90 min;

(4) weighing the fermented dough, dividing same into small doughs with a single weight of 40 g, and proofing same for 80-100 min at a temperature of 35-40° C. and a relative humidity of 80-90% to obtain a bread dough;

(5) putting the bread dough into an oven for baking at a temperature of 180-210° C., and taking the baked bread out after baking for 15 minutes.

Example 3

For a bread with D-allulose instead of sucrose, the weight ratio of each raw material component in its recipe is as follows:

| | |
|---|---|
| Flour | 50 parts; |
| Gluten powder | 5 parts; |
| D-allulose | 10 parts; |
| Eggs | 5 parts; |
| Milk | 10 parts; |
| Fresh yeast | 5 parts; |
| Butter | 4 parts; |
| Composite bacterial powder | 0.4 parts; |
| Water | 20 parts; |

Among them, the composite bacterial powder is a mixture of *Lactobacillus acidophilus, Lactobacillus casei, Lactobacillus rhamnosus, Bifidobacterium longum* and *Bifidobacterium lacti* at a mass ratio of 0.5:3.5:0.5:2.5:2.5.

The preparation process comprises the following steps:

(1) stirring and dispersing a fresh yeast and a composite bacterial powder in a warm water at 30° C.-40° C. to obtain a mixed bacterial liquid;

(2) putting the flour, the gluten power, and the D-allulose into a dough mixer, stirring same for 2-3 min at 100-150 r/min to uniformly mix the dry powder, then adding the eggs, the milk, and the mixed bacterial liquid in sequence under stirring, stirring same for 5-10 min at 100-150 r/min; kneading same to obtain a shaped dough, then adding the butter, stirring same for 3-5 min at 250-300 r/min to obtain a finally shaped dough;

(3) putting the prepared dough at a temperature of 35-40° C. and a relative humidity of 80-90% to ferment for 60-90 min;

(4) weighing the fermented dough, dividing same into small doughs with a single weight of 50 g, and proofing same for 80-100 min at a temperature of 35-40° C. and a relative humidity of 80-90% to obtain a bread dough;

(5) putting the bread dough into an oven for baking at a temperature of 180-210° C., and taking the baked bread out after baking for 16 minutes.

Example 4

For a bread with D-allulose instead of sucrose, the weight ratio of each raw material component in its recipe is as follows:

| | |
|---|---|
| Flour | 50 parts; |
| Gluten powder | 4 parts; |
| D-allulose | 8 parts; |
| Eggs | 7 parts; |
| Milk | 7 parts; |
| Fresh yeast | 4 parts; |
| Butter | 5 parts; |
| Composite bacterial powder | 0.5 parts; |
| Water | 20 parts; |

Among them, the composite bacterial powder is a mixture of *Lactobacillus acidophilus, Lactobacillus casei, Lactobacillus rhamnosus, Bifidobacterium longum* and *Bifidobacterium lacti* at a mass ratio of 1.5:1.5:0.5:1:3.

The preparation process comprises the following steps:

(1) stirring and dispersing a fresh yeast and a composite bacterial powder in a warm water at 30° C.-40° C. to obtain a mixed bacterial liquid;

(2) putting the flour, the gluten power, and the D-allulose into a dough mixer, stirring same for 2-3 min at 100-150 r/min to uniformly mix the dry powder, then adding the eggs, the milk, and the mixed bacterial liquid in sequence under stirring, stirring same for 5-10 min at 100-150 r/min; kneading same to obtain a shaped dough, then adding the butter, stirring same for 3-5 min at 250-300 r/min to obtain a finally shaped dough;

(3) putting the prepared dough at a temperature of 35-40° C. and a relative humidity of 80-90% to ferment for 60-90 min;

(4) weighing the fermented dough, dividing same into small doughs with a single weight of 55 g, and proofing same for 80-100 min at a temperature of 35-40° C. and a relative humidity of 80-90% to obtain a bread dough;

(5) putting the bread dough into an oven for baking at a temperature of 180-210° C., and taking the baked bread out after baking for 17 minutes.

Example 5

For a bread with D-allulose instead of sucrose, the weight ratio of each raw material component in its recipe is as follows:

| | |
|---|---|
| Flour | 55 parts; |
| Gluten powder | 3 parts; |
| D-allulose | 5 parts; |
| Eggs | 10 parts; |
| Milk | 10 parts; |

-continued

| | | |
|---|---|---|
| Fresh yeast | 3 | parts; |
| Butter | 5 | parts; |
| Composite bacterial powder | 0.5 | parts; |
| Water | 22 | parts; |

Among them, the composite bacterial powder is a mixture of *Lactobacillus acidophilus, Lactobacillus casei, Lactobacillus rhamnosus, Bifidobacterium longum* and *Bifidobacterium lacti* at a mass ratio of 2:2:1:3:1.

The preparation process comprises the following steps:

(1) stirring and dispersing a fresh yeast and a composite bacterial powder in a warm water at 30° C.-40° C. to obtain a mixed bacterial liquid;

(2) putting the flour, the gluten power, and the D-allulose into a dough mixer, stirring same for 2-3 min at 100-150 r/min to uniformly mix the dry powder, then adding the eggs, the milk, and the mixed bacterial liquid in sequence under stirring, stirring same for 5-10 min at 100-150 r/min; kneading same to obtain a shaped dough, then adding the butter, stirring same for 3-5 min at 250-300 r/min to obtain a finally shaped dough;

(3) putting the prepared dough at a temperature of 35-40° C. and a relative humidity of 80-90% to ferment for 60-90 min;

(4) weighing the fermented dough, dividing same into small doughs with a single weight of 60 g, and proofing same for 80-100 min at a temperature of 35-40° C. and a relative humidity of 80-90% to obtain a bread dough;

(5) putting the bread dough into an oven for baking at a temperature of 180-210° C., and taking the baked bread out after baking for 18 minutes.

Comparative Example 1

Substantially the same as Example 1, the only difference is that the D-allulose is replaced with the same amount of white granulated sugar.

Comparative Example 2

Substantially the same as Example 3, the only difference is that the fresh yeast is replaced with the same amount of a yeast power.

Comparative Example 3

Substantially the same as Example 3, the only difference is that the composite bacterial powder is omitted.

Comparative Example 4

Substantially the same as Example 3, the only difference is that the composite bacterial powder is replaced with the same amount of *Lactobacillus acidophilus*.

Comparative Example 5

Substantially the same as Example 3, the only difference is that the composite bacterial powder is replaced with the same amount of *Bifidobacterium longum*.

Effect Example 20 evaluators were invited to perform sensory evaluation on the above-mentioned bread with D-allulose instead of sucrose. The evaluation criteria and basis are shown in Table 1, and the comprehensive score is shown in Table 2, where the score is the average score of the 20 evaluators (the sensory evaluation radar chart of Examples and Comparative Examples is shown in FIG. 1).

TABLE 1

| Sensory evaluation criteria for bread | | | |
|---|---|---|---|
| Evaluation item | | Sensory evaluation | Score |
| Appearance score | Bread crust uniformity (10 points) | Very uniform | 8-10 |
| | | Too light color or too deep color around the bread crust | 5-7 |
| | | Very dark color or very light color | 0-4 |
| | Bread crust color (10 points) | Toast tan, appetizing | 8-10 |
| | | Yellow, brown | 5-7 |
| | | Nonuniform color | 0-4 |
| | Appearance and shape (10 points) | Symmetrical and full | 8-10 |
| | | Relatively symmetrical and full | 5-7 |
| | | Shrinkage and deformation | 0-4 |
| | Elasticity and flexibility (10 points) | Soft, good press recovery ability | 8-10 |
| | | Relatively soft, average press recovery ability | 5-7 |
| | | Relatively hard, poor press recovery ability | 0-4 |
| | Bread crust texture (10 points) | Soft | 8-10 |
| | | Relatively soft | 5-7 |
| | | Relatively hard | 0-4 |
| Interior score | Granules and pores (10 points) | Uniform and fine granules, relatively large and uniform pores | 8-10 |
| | | Coarse granules, relatively large and nonuniform pores | 5-7 |
| | | Coarse granules, few and small-volume pores | 0-4 |
| | Interior color (10 points) | Uniform color | 8-10 |
| | | Relatively uniform color | 5-7 |
| | | Nonuniform color | 0-4 |
| | Fragrance (10 points) | Strong fragrance | 8-10 |
| | | Moderate fragrance | 5-7 |
| | | Insufficient fragrance | 0-4 |

TABLE 1-continued

| | Sensory evaluation criteria for bread | |
| --- | --- | --- |
| Evaluation item | Sensory evaluation | Score |
| Taste and mouthfeel (10 points) | Moderate taste, delicate and soft mouthfeel | 8-10 |
| | Bland taste, rough mouthfeel | 5-7 |
| | Bad taste, loose and dry mouthfeel | 0-4 |
| Organizational structure (10 points) | Excellent elasticity, small and fine holes | 8-10 |
| | Moderate elasticity, too loose or too tight and rough | 5-7 |
| | Poor elasticity, rough and broken, large holes | 0-4 |

TABLE 2

| | Sensory evaluation result | | | | | | | | | | |
| --- | --- | --- | --- | --- | --- | --- | --- | --- | --- | --- | --- |
| | Exterior score | | | | | Interior score | | | | | |
| Test item | Bread crust uniformity | Bread crust color | Appearance and shape | Elasticity and flexibility | Bread crust texture | Granules and pores | Interior color | Fragrance | Taste and mouthfeel | Organizational structure | Total Score |
| Example 1 | 10 | 10 | 10 | 9 | 10 | 10 | 9 | 9 | 9 | 9 | 95 |
| Example 2 | 10 | 10 | 10 | 10 | 10 | 10 | 9 | 9 | 10 | 9 | 97 |
| Example 3 | 10 | 10 | 10 | 9 | 10 | 10 | 10 | 10 | 10 | 9 | 98 |
| Example 4 | 10 | 10 | 10 | 9 | 10 | 10 | 9 | 10 | 10 | 9 | 97 |
| Example 5 | 10 | 9 | 10 | 8 | 10 | 10 | 10 | 9 | 9 | 9 | 94 |
| Comparative example 1 | 10 | 9 | 10 | 9 | 10 | 10 | 8 | 8 | 7 | 9 | 90 |
| Comparative example 2 | 9 | 9 | 9 | 7 | 10 | 9 | 9 | 9 | 6 | 7 | 84 |
| Comparative example 3 | 8 | 9 | 8 | 5 | 9 | 5 | 7 | 6 | 9 | 6 | 70 |
| Comparative example 4 | 9 | 9 | 9 | 6 | 10 | 7 | 8 | 7 | 7 | 6 | 78 |
| Comparative example 5 | 9 | 9 | 9 | 6 | 10 | 8 | 8 | 7 | 8 | 7 | 81 |

As can be seen from the evaluation score results in Table 2, the total scores of the five groups of comparative examples are all around 80 points, and the total score of the D-allulose bread in Examples 1-5 of the present invention is around 96 points, indicating that the bread provided by the invention is golden in color, attractive in appetite and fluffy and delicious.

The invention adds some gluten powder to the bread. The protein content in the gluten powder is relatively high, and the amino acid composition is relatively complete, thus the gluten powder is a nutritious vegetable protein source and improves the nutritional value of the bread. In addition, the gluten powder also has good extensibility and film formability, which would improve the gluten network elasticity and chewiness of the bread.

*Lactobacillus* and *Bifidobacterium* would produce organic acids during the fermentation process, lower the pH value of the dough, increase the enzyme activity in the dough, and promote the hydrolysis of proteins and starches, which can not only improve the texture of the bread, but also produce a large number of flavor precursors such as nonanone, heptanal, ethyl caproate, etc., making the flavor of the bread richer.

D-allulose can react with proteins to generate more Maillard products, which can improve the color of the bread and increase the aroma of the bread. It can be said that the "color, aroma and taste" of the bread are improved at the same time, and what is even more important is the bread would not raise blood sugar, has very low calories, and is very friendly to people's health.

The foregoing descriptions of specific exemplary embodiments of the present invention have been presented for purposes of explanation and illustration. These descriptions are not intended to limit the invention to the precise form disclosed, and obviously many modifications and variations can be made in light of the above teaching. The purpose of selection and description of the exemplary embodiments is to explain the specific principles of the invention and its practical application, thereby enabling those skilled in the art to realize and utilize various exemplary embodiments of the invention, as well as various selections and modifications. It is intended that the scope of the invention is to be defined by the claims and their equivalents.

The invention claimed is:

1. A bread with D-allulose instead of sucrose, consisting of following materials in parts by weight:

40-60 parts of flour, 3-5 parts of gluten powder, 5-10 parts of D-allulose, 5-10 parts of eggs, 5-10 parts of milk, 3-5 parts of yeast, 4-6 parts of butter, 0.4-0.6 parts of composite bacterial powder, and 15-25 parts of water, wherein a protein content of the flour is 11.5-13.5%;

wherein the yeast is a fresh yeast; and wherein the composite bacterial powder consists of *Lactobacillus acidophilus, Lactobacillus casei, Lactobacillus rhamnosus, Bifidobacterium longum* and *Bifidobacterium lactis* mixed in a mass ratio of (0.5-2):(2-4):(0.5-2):(1-3):(1-3).

* * * * *